US007636687B2

(12) United States Patent
Foster et al.

(10) Patent No.: US 7,636,687 B2
(45) Date of Patent: Dec. 22, 2009

(54) METHOD AND SYSTEM FOR COMPLETING A LEASE FOR REAL PROPERTY IN AN ON-LINE COMPUTING ENVIRONMENT

(75) Inventors: Paul Foster, New York, NY (US); Richard Warshauer, New York, NY (US)

(73) Assignee: General Electric Capital Corporation, Stamford, CT (US)

( * ) Notice: Subject to any disclaimer, the term of this patent is extended or adjusted under 35 U.S.C. 154(b) by 1579 days.

(21) Appl. No.: 09/766,727

(22) Filed: Jan. 22, 2001

(65) Prior Publication Data
US 2002/0062277 A1    May 23, 2002

Related U.S. Application Data

(60) Provisional application No. 60/252,285, filed on Nov. 20, 2000.

(51) Int. Cl.
G06Q 40/00    (2006.01)
(52) U.S. Cl. .......................................... 705/38; 705/35
(58) Field of Classification Search .................. 705/35, 705/38
See application file for complete search history.

(56) References Cited

U.S. PATENT DOCUMENTS

| 5,414,621 | A | 5/1995 | Hough |
| 5,664,115 | A | 9/1997 | Fraser |
| 5,680,305 | A | 10/1997 | Apgar, IV |
| 5,699,527 | A | 12/1997 | Davidson |
| 5,754,850 | A | 5/1998 | Janssen ...................... 395/615 |
| 5,802,501 | A | 9/1998 | Graff |
| 5,857,174 | A | 1/1999 | Dugan |
| 5,892,900 | A | 4/1999 | Ginter et al. |
| 5,970,475 | A | 10/1999 | Barnes et al. |
| 6,023,687 | A | 2/2000 | Weatherly et al. ............. 705/38 |
| 6,049,784 | A | 4/2000 | Weatherly et al. ............. 705/38 |
| 6,115,694 | A | 9/2000 | Cheetham et al. |
| 6,321,202 | B1 * | 11/2001 | Raveis, Jr. ...................... 705/1 |
| 6,351,738 | B1 | 2/2002 | Clark |
| 6,785,661 | B1 | 8/2004 | Mandler et al. |
| 6,871,140 | B1 * | 3/2005 | Florance et al. ............. 701/207 |

(Continued)

OTHER PUBLICATIONS

U.S. Appl. No. 60/186,477, filed Mar. 2, 2000.*

(Continued)

Primary Examiner—Lalita M Hamilton
(74) Attorney, Agent, or Firm—King & Spalding LLP

(57) ABSTRACT

The present invention relates to completing a lease for property in an on-line computing environment. A distributed computer network can enable a user to access multiple databases and to obtain comparables data related to a property of interest for use in calculations. This can enable users to access the latest, broadest set of relevant property data and to select relevant comparable values quickly and with minimal manual intervention. An on-line property management environment can comprise a distributed computer network coupled to numerous client computers, a property services server platform connected to a local database, and numerous property information databases. Building owners or their agents can list their available space for rent on a web site hosted b (a property services server platform in a distributed computing environment. Commercial tenants or their agents requiring space can either directly enter the property services server platform or enter through allied sites.

21 Claims, 8 Drawing Sheets

U.S. PATENT DOCUMENTS

| | | | | |
|---|---|---|---|---|
| 6,904,412 | B1 * | 6/2005 | Broadbent et al. | 705/38 |
| 7,143,048 | B1 * | 11/2006 | Ruben et al. | 705/1 |
| 2001/0005829 | A1 | 6/2001 | Raveis, Jr. | |
| 2001/0034607 | A1 | 10/2001 | Perschbacher, III et al. | |
| 2001/0037273 | A1 | 11/2001 | Greenlee, Jr. | 705/35 |
| 2001/0039506 | A1 | 11/2001 | Robbins | |
| 2001/0047282 | A1 | 11/2001 | Raveis, Jr. | |
| 2001/0051960 | A1 | 12/2001 | Kubick et al. | |
| 2002/0004737 | A1 | 1/2002 | McVeigh | |
| 2002/0035535 | A1 | 3/2002 | Brock, Sr. | 705/37 |
| 2002/0046159 | A1 | 4/2002 | Raveis, Jr. | 705/38 |
| 2002/0052814 | A1 | 5/2002 | Ketterer | |
| 2002/0059137 | A1 | 5/2002 | Freeman et al. | |
| 2002/0062218 | A1 | 5/2002 | Pianin | 705/1 |
| 2002/0062277 | A1 | 5/2002 | Foster et al. | 705/38 |
| 2004/0143450 | A1 | 7/2004 | Vidali | |
| 2005/0091305 | A1 | 4/2005 | Lange et al. | |
| 2006/0161482 | A1 | 7/2006 | Jacobson et al. | |
| 2008/0103963 | A1 | 5/2008 | Mahoney et al. | |

OTHER PUBLICATIONS

U.S. Appl. No. 60/189,635.*

Concentrex Announces Alliance With FIRSTCORP to Offer Leasing Services To Banks via Internet PR Newswire. New York: Mar. 30, 2000. p. 1.*

Bamboo.com Receives $12.5 Million Investment From Intel, Trident Capital and the Walden Group Business Editors/High-Tech Writers. Business Wire. New York: Apr. 12, 1999. p. 1.*

PropertyFirst—Home Page- www.propertyfirst.com/main.asp—May 9, 2001.

PropertyFirst—Search for Sale—www.propertyfirst.com/search/page1.asp?imgtype=forsale—May 9, 2001.

PropertyFirst—Search for Lease—www.pfcweb02.propertyfirst.com/wfl1/new_search_step1.asp—May 9, 2001.

PropertyFirst—Commercial Real Estate Broker Search—www.propertyfirst.com/directory/directory.asp?imgtype=directory&membertype=2—May 9, 2001.

PropertyFirst—About Us—www.propertyfirst.com/aboutus/aboutus.asp—May 9, 2001.

PropertyFirst—Logon Page—www.propertyfirst.com/logon.asp?imgtype=addlisting&FromLocation=addListing—May 9, 2001.

Storetrax—www.storetrax.com/stx/autologin.do—May 9, 2001.

Storetrax—About Us—About Storetrax—www.storetrax.com/stx/aboutus.jsp—May 9, 2001.

Storetrax—Find Space—www.storetrax.com/stx/startquicksearch.do—May 9, 2001.

Storetrax—List Space—www.storetrax.com/stx/listspace.jsp—May 9, 2001.

Storetrax—Forum—Forum List—www.storetrax.com/forum—May 9, 2001.

Storetrax—Home Page—www.storetrax.com/stx/autologin.do—May 9, 2001.

Stoetrax—About Us—About Storetrax—www.storetrax.com/stx/aboutus.jsp—May 9, 2001.

"Real Estate News and Advice", *Realty Times* (online). Apr. 7, 2000. Retrieved from the internet: <URL http://web.archive.org/web/20000407223740/http://realtytimes.com>.

"Real Estate Center Online News", *Real Estate Center* (online). Aug. 11, 2000. Retrieved from the internet: <URL http://web.archive.org/web/20000815095134/recenter.tamu.edu/news/recon.html>.

Hanrahan, Michael J.; "Future lies in Investment Analysis, Property Management Programs", National Real Estate Investor v 35n1 pp. 69-79, Jan. 1993.

* cited by examiner

METHOD AND SYSTEM FOR COMPLETING A LEASE FOR REAL PROPERTY IN AN ON-LINE COMPUTING ENVIRONMENT

RELATED APPLICATION

Applicants claim priority under 35 USC §119(e) to U.S. Provisional Application Ser. No. 60/252,285, filed Nov. 20, 2000, entitled "Completing a Lease for Real Property in an On-line Computing Environment", the disclosure of which is fully incorporated herein by reference.

TECHNICAL FIELD

The present invention is generally directed to leasing transactions for real estate properties. More particularly described, the present invention provides an on-line computing environment for lease transactions in the commercial real estate field by using a distributed computer network to support communication, negotiation, and transaction tasks conducted by brokers, property owners, tenants, and their advisors.

BACKGROUND OF THE INVENTION

Commercial leasing transactions are completed today with the support of "off-line" personal relationships among commercial real estate brokerage firms, property owners, and tenants. A commercial real estate broker attempts to identify and match the property space requirements of a potential tenant with the property of the represented property owner. To "broker" a lease, the broker typically completes computer-aided and manual searches of property listings to locate potential matching properties and facilitates lease term negotiations between the owner and the tenant. The scope of a broker's network and her proposal relationships in the commercial real estate field plays a significant role in closing a lease transaction.

To expand the typical broker's network of relationships and to increase the number of potential property representations, at least one company is listing commercial real estate lease opportunities at a Web site accessible by brokers. Although this Web site facilitates the matching of a tenant's property requirements with available properties, the Web site does not support the negotiation closing of a lease transaction in an on-line electronic environment. In other words, brokers, property owners, and potential tenants move to the traditional "off-line" environment to negotiate and close a typical lease transaction initiated by a listing published at this Web site. This results in an inefficient allocation of resources to complete a lease transaction because the present on-line solution fails to take full advantage of the communication efficiency and scope of resources available on the Internet.

Consequently, there is a need in the art for an on-line solution that addresses the primary tasks completed in a typical lease transaction, including the identification of a property matching a potential tenant's requirements, site visit and space calculations, lease term negotiations, and lease execution.

SUMMARY OF THE INVENTION

The present invention solves the above problems by providing a method and system for completing a lease for property in an on-line computing environment. The distributed computer network can enable a user to access multiple databases and to obtain comparables data related to a property of interest for use in calculations. This can enable users to access the latest, broadest set of relevant property data and to select relevant comparable values quickly and with minimal manual intervention. An on-line property management environment can comprise a distributed computer network, such as the global Internet, coupled to numerous client computers, a property services server platform connected to a local database, and numerous property information databases. The client computers can represent typical users of property services hosted by the property services server platform. The client computers can also represent service providers for servicing the activities of users in the property management field. The property services server platform can provide real estate industry services, including content, decision support tools, transaction exchanges, and access to key members of the real estate community and its service providers.

Building owners or their agents can list their available space for rent on a Web site hosted by a property services server platform in a distributed computing environment. Commercial tenants requiring space can either directly enter the property services server platform or, more likely, enter through allied sites. Real estate brokers employed by tenants can directly access the property services server platform.

There can be three alternative embodiments for completing on-line leasing transactions in accordance with the present invention. Alternative embodiment 1 can include research capabilities, valuation and calculator tools, a community of accounting, legal and environmental experts, space listings, referrals to financing sources, third-party provider and professional service firms, links to preferred procurement and online recruiting, free research, a valuation of the proposed deal, and digital documents. Alternative embodiment 2 can add numerous functions to alternative embodiment 1. These can include valuation and property management ASP software, the workflow functionality, local GE office, additional content and service vendors, enhanced Web site features, chat rooms to extend the workspace concept, lease management, budgeting and forecasting, property management, and valuation tools. Alternative embodiment 3 can build on alternate embodiment 2, and can add multiple counterparties to rapidly evaluate a deal and post a bid online with due diligence supported by service provider links.

DETAILED DESCRIPTION OF THE EXEMPLARY EMBODIMENTS

Figure 1:
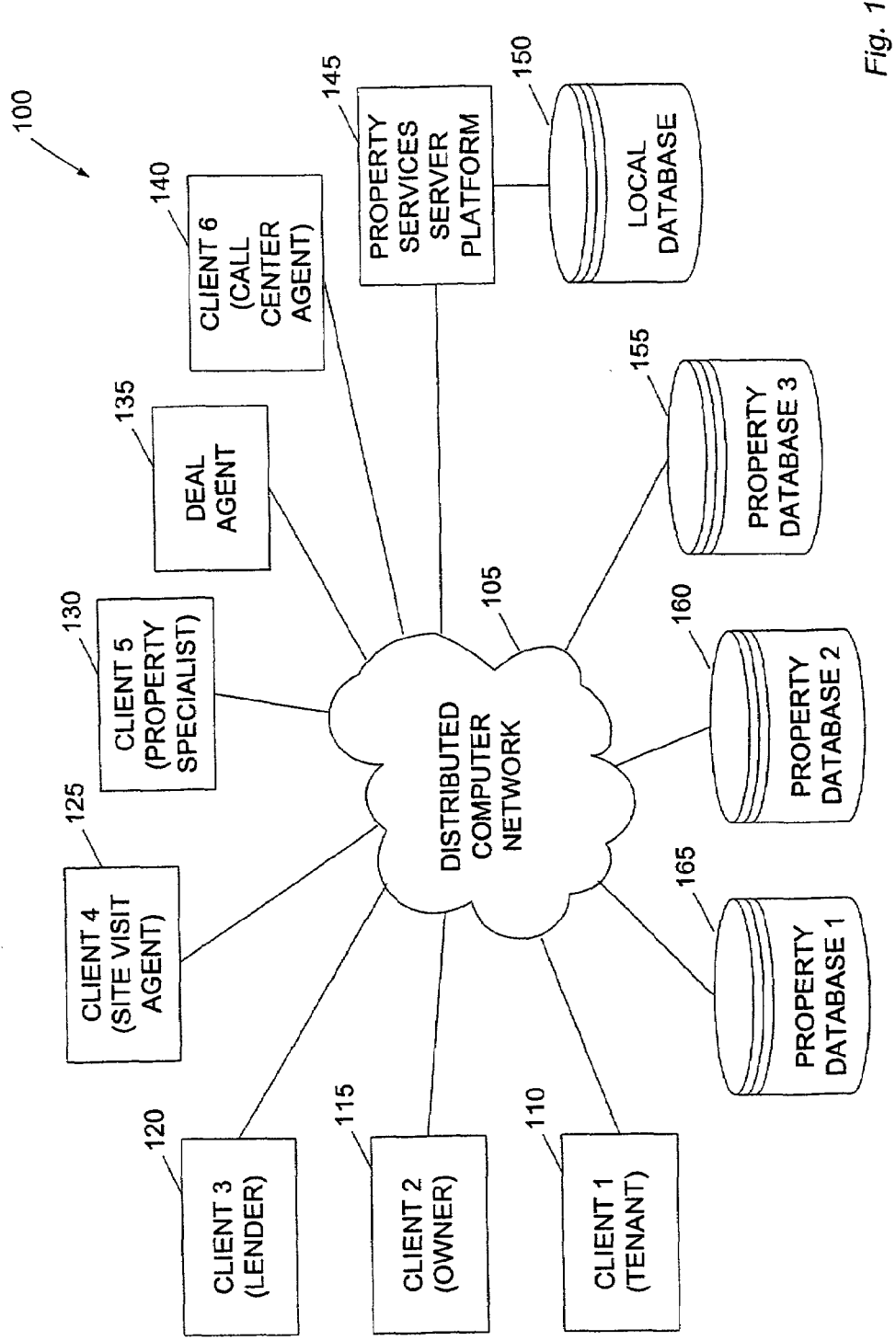
FIG. 1 is a block diagram illustrating the primary components of an on-line operating environment for leasing transactions constructed in accordance with an exemplary embodiment of the present invention.

The present invention supports the completion of a transaction cycle for leasing commercial real estate over a distributed computer network, such as the Internet.

Building owners or their agents can list their available space for rent on a Web site hosted by a property services server platform in a distributed computing environment. The space can be listed in one of two ways:

1) The property services server platform listings database will interface with the owner's property management program to download available space at a predetermined time before lease expiration.
2) Users, who are often owners or agents, using a client computer running a browser, can access a server to obtain lease information through a Web site that accesses available databases.

The listing comprises the salient information regarding the space (area, date of availability, asking rent, etc.), as well as an e-mail and telephone contact for the owner or the building agent.

Commercial tenants requiring space can either directly enter the property services server platform or, more likely, enter through allied sites. Real estate brokers employed by tenants can directly access the property services server platform. The property services server platform provides them with a search-and-match ability, by which they can search a national space database by product type (office, retail and industrial). The search can be further defined by city, submarket, amount of space, asking rent and a number of related variables. Also, they can search by building name or address. Users may use a Tenant Space Planning calculator to translate their proposed headcount at a new location into square footage requirements.

The work product of the search is an availability survey, which lists the properties meeting the given standards. The availability search provides the users with a significant amount of information about the property and the availability of suites or floors. In addition, the users can access the Research section of the property services server platform, where they can view and purchase macro- and microeconomic data and demographics reports about the target area.

The tenant can draw-up a short list of properties and set-up space inspection appointments as desired through the property services server platform. Site Inspection Agents will show the space, after which the users can submit an offer or request a proposal from the owner online through the property services server platform. Deal agents at the central Customer Experience Center and the Regional Specialists in the local areas can assist the tenants during the entire leasing process. For example, a deal agent can initially aid the tenants in putting together an offer or responding to an owner's proposal. The tenant's original proposal or response to an owner's offering is drafted within a highly-detailed template containing all the key business elements of a commercial leasing transaction—it will remain the central collaboration feature of negotiations and will eventually populate the lease documents.

The tenant and owner (with or without their respective brokers) can exchange bid-and-ask iterations of the proposal template online through the property services server platform. Each party can control its version of the document and may delegate authorship rights to their respective professionals and advisors. In addition, a party can use a calculator available at the property services server platform to subject each iteration to a discounted cash flow analysis. Both the tenant and the owner can use comparison charts detailing, in the case of the tenant, offers at multiple locations and, in the case of the owner, multiple offers on the same property. Upon final mutual approval ("meeting of the minds"), the last document will be an electronic term sheet to be signed (online or offline) by both parties.

The term sheet can be activated by the owner to populate its standard form of lease. Each owner may take the online form for the appropriate property type and amend it via check boxes to include a large number of secondary and proprietary clauses and state-specific language. Using the same collaboration software and "ball-in-court" methodology as in arriving at the term sheet, the owner can release the electronic document to its professional advisers, the tenant and the tenant's advisors. Comments, in redline fashion, can be exchanged by the parties in an on-line environment until final agreement on all terms, conditions and wording is reached.

At that point, the owner will distribute, via the property services server platform, execution copies of the lease. The tenant, using the property services server platform, will digitally execute the document and deposit in escrow to a payment service the closing disbursements (first month's rent, security deposit, etc.). Upon counter-signature by the owner, fully-executed copies of the lease will appear in the owner's and tenant's "My Personalized WorkSpace" area of the property services server platform and all disbursements will be distributed to appropriate parties.

If desired, owners can upload the essential lease terms to their property management software systems to begin the rent collection cycle. If appropriate, they can also upload the relevant lease terms to an allied project management system, which will track the progress of the tenant installation work (the completion of which is often the starting point of rent collection). Owners may also archive some or all of the lease drafts and final document in their "My Personalized WorkSpace" archive.

On-Line Real Estate Services Environment

Turning now to the figures, in which like reference numbers are assigned to like elements, FIG. 1 is a block diagram illustrating the primary components of a representative operating environment for an exemplary embodiment of the present invention. An on-line property management environment 100 comprises a distributed computer network 105, such as the global Internet, coupled to numerous clients 110-140, a property services server platform 145 connected to a local database 150, and numerous property information databases 155-165. For the client-server computing environment shown in FIG. 1, the client computers 110 and 115 represent typical users of property services hosted by the property services server platform 145. The client computers 120-140 represent service providers for servicing the activities of users in the property management field. For example, typical consumers of the property services accessible at the property services server platform 145 via the distributor computer network 105 include property tenants and property owners, as shown at the client computers 110 and 115. Representative service providers in the property management field include lenders, site visit agents, engineering, appraisal and environmental specialists, deal agents, and call center agents, as shown in connection with client computers 120-140.

The property services server platform 145 provides real estate industry services, including content, decision support tools, transaction exchanges, and access to key members of the real estate community and its service providers. For example, the property services server platform 145 can provide users operating client computers with convenient access to budgeting, forecasting, and valuation tools in the real estate field. The property services server platform 145 also enables a user, such as a tenant at the client 110 or a property owner at the client 115, to communicate via electronic mail with a lender at the client 120; a site visit agent at the client 125; a property specialist operating at the client 130; a deal agent operating at the client 135; or a call center agent operating at the client 140. The property services server platform 145 also can publish information at one or more Web site pages to facilitate the matching of a user, such as a tenant or owner, to a lender, site visit agent service provider or deal agent. Although the matching of a user to a desired party can be facilitated by the on-line environment shown in FIG. 1, it will be appreciated that communications between these parties can be further accomplished by a variety of conventional means, including telephone, electronic mail messages, facsimile correspondence, mail delivery, etc.

The electronic communications framework of the on-line operating environment 100 enables a user, such as a tenant or owner, to efficiently identify and communicate with a variety of parties associated with the typical evaluation and closing of a real estate transaction. A lender, represented by the client 120, can work with a property owner or tenant to support financing requirements in connection with a real estate transaction. A site visit agent, represented by the client 125, can support a tenant's on-site review and analysis of a property under consideration. A property specialist, represented by the client 130, can provide property-related expertise, such as engineering, appraisal, or environmental services, to a user in connection with a real estate transaction. A deal agent, represented by the client 135, can assist a user by screening, negotiating, and closing real estate-related transactions on behalf of that user.

Site Visit Agent

A site visit agent, typically based in a location proximate to the property or space of interest, can support a purchase or lease decision by showing the property or space to the parties of a transaction, such as tenants, owners, and lenders. For example, a site visit agent can visit a building or space of interest with an owner or purchaser and offer her expertise about the visit site, including configuration alternatives, build-out costs, etc. In contrast to a real estate broker, who often juggles several real estate transaction tasks at once, a site visit agent is focused solely on showing properties on behalf of her customer. A user can select a site visit agent from information published at the property services server platform 145 or by requesting information from a call center agent. The user communicates with a selected site visit agent, represented by the client 125, via the on-line environment 100 or by other conventional means.

Property Specialist

The property services server platform 145 also provides a convenient on-line forum for connecting a variety of property specialists to the potential users of those services. For example, a tenant operating the client 110 can obtain information from the property services server platform 145 about the services offered by property specialists represented by the client 130, including appraisal, engineering, and environmental services. This information can include the identity of property specialists within a specified profession, such as engineering, appraisal or environmental services; contact information for property specialists in the selected field; and fee estimates for services provided by the listed property specialists. Consequently, the real property services service platform 145 provides a marketplace that enables a user to identify and to select a desired service provider within the framework of the on-line environment 100.

For example, a customer operating from a client site, such as a tenant client 110 or an owner client 115, can gain access to a service provider based upon the user's issuance of a request to the property services server platform 145. In turn, the property services server platform 145 can respond to this request by presenting information sufficient to facilitate a communication between the parties. For example, this communication link can be established by the server platform 145 via a hyperlink to a service provider's web site, electronic mail to a service provider, or publication of service provider contact information.

Deal Agent

A deal agent, represented by the client 135, can work on behalf of a user to support the completion of a property-related transaction, including leasing, financing, and buy-sell exchanges. The property services server platform 145 provides an on-line forum listing deal agents available to support a user's real estate transaction. In the absence of a relationship with another service provider, the user can rely upon the real estate expertise of a deal agent in evaluating and completing a property transaction. A user operating a client site, such as the client 110 or 115, can obtain the services of a deal agent by issuing a request to the property services server platform 145 or by contacting a customer service agent at the client 140. For example, the property services server platform 145 can establish communications between the user and a deal agent via selection of a hyperlink to a deal agent's web's site, electronic mail to a deal agent, or publication of contact information for a deal agent. The user also can contact a customer service agent based upon contact information published at the property services server platform 145.

Call Center Agent

A call center agent can handle a variety of contacts by customers of the property services, including requests for products and services; billing inquiries; Website assistance; and property services-related questions. A call center agent, typically located at a central call center site, can facilitate the scheduling of support by a site visit agent, a property specialist, or a deal agent, by responding to the schedules of the agent and the customer. In this manner, a call center agents operating at the client 140 can provide basic customer service via electronic communications, such as e-mail, by telephone, or other conventional communication means.

It will be appreciated that the call center functions are preferably delegated to personnel with a variety of call center and real estate experiences. For example, customer service agents with limited real estate experience can provide basic customer services, whereas deal agents with more substantial real estate experience can support the detailed aspects of leasing, financing, and buy-sell deals. Call center agents and deal agents can be housed in a central location to provide support to a variety of geographically dispersed users connected to the distributed computer network 105 via client computers.

Communications between lenders, site visit agents, deal agents, property specialists, call center agents and the customer are supported by electronic communications carried by the distributed computer network 105 or other conventional communication means. Although only a single client computer is shown in FIG. 1 for each of the service functions, it will be appreciated that the on-line environment 100 can include multiple client computers supporting lending, site visit, property specialist, deal and call center services.

Local and Remote Databases

Although the property services server platform 145 can access content and related property data from a local database 150, it will be appreciated that the distributed nature of the computing environment shown in FIG. 1 also supports retrieval of such information from remote data sources, such as the property databases 155, 160 and 165. The distributed nature of the computer network 105 in the on-line environment 100 facilitates a user accessing information relevant to a real estate transaction in databases maintained at remote geographical sites. Significantly, users are no longer constrained from reaching a decision about a real estate transaction based only upon locally available information, such as the property information maintained at the user's desktop computer. The property services server platform 145 provides a central forum for a user's retrieval of real estate-related information from a variety of on-line services.

Property Services Server Platform

The property services server platform 145 can support an ASP model by delivering software applications or tools to users operating various clients, such as the tenant client 110, the owner client 115 or the lender client 120. This ASP model allows a client running a Web browser to connect via the distributed computer network 105 to the property services server platform 145 and to access a variety of real estate-related applications and to manipulate and store real estate data. Typical applications operated by the property services server platform 145 include budgeting, financing, forecasting, and valuation tools for the real estate industry.

The valuation tool allows the customer at a client-computing site to value a real estate asset by inputting information about the asset's actual and projected revenues and expenses. In addition, the user can access objective benchmark data, such as property comparables, maintained at the local database 150 or databases maintained by third parties, such as the property databases 155, 160 and 165. A user can use the valuation tool within the ASP model to assess the relative value of a building, to model alternative scenarios, and to address due diligence issues based upon a variety of assumptions. The output of the valuation process can be formatted in a standard electronic format for transmission to other clients coupled to the distributed computer network 105, such as the lender client 120, to facilitate a real estate transaction.

Other applications available at the ASP model hosted by the property services server platform 145 include payback calculation tools, cash flow calculation tools and space calculation tools. The payback calculation tools can include a lease improvement calculator, a direct capitalization calculator and a refinancing calculator. A user can operate the lease improvement calculator to calculate how much of standard rent will go towards building standard improvements and how much profit is available from such standard improvements. The direct capitalization calculator allows a user to calculate a capitalization rate. The refinancing calculator allows a user to calculate refinance loan savings and break-even terms.

The cash flow calculation tools include a mortgage and amortization calculator and an affordability calculator. A user can operate the mortgage and amortization calculator to calculate mortgage payments on a fixed or a variable commercial loan and to calculate principal and interest payments over the term of a fixed loan. The affordability calculator allows a user to calculate the loan amount based on net operating income (NOI) and basic underwriting criteria.

A user can operate the space calculator to complete tenant space planning calculations, including calculations for determining the amount of office space required by a tenant.

The property services server platform 145 also operates as a Portal by providing a central Web site for a consumer's real estate-related operations. For Portal operations, the property services server platform 145 aggregates a variety of real estate-related tools and services at a single Web site accessible by consumers, service providers and agents via client computers. For example, the property services server platform 145 can offer consumers the opportunity to use a single Web site to conveniently complete due diligence activities for a real estate transaction, to analyze market aspects of the transaction, to finance the transaction and to access service providers in support of the transaction. A consumer operating a browser at a client site, such as the client 110 or 115, can create a "personalizable" workspace for her real estate-related transactions at the property services server platform 145. This server platform also provides a central location in an on-line computing environment for reviewing a consumer's real estate activities, current real estate news and research, and relevant property and stock market information. Typical portal operations include the personalizable workspace, described as "My Workspace," a variety of services, including research, financing, leasing, and calculation tools, and access to real estate experts.

For example, the property services server platform 145 supports the delivery of a variety of services to a client via the distributed computer network 105, including research, financing, leasing, and other business services. A user operating from a client-computing site, such as the owner client 115, can research a specified property topic by requesting results from the property services server platform 145. The property services server platform 145 can respond to this research request by obtaining relevant research information from either the local database 150 or one or more of the property databases 155, 160 or 165. Typical research includes commercial real estate news, typically sorted by property-type, market, or company name, market indices, interest rates, stock prices, and market demographics.

For financing services, property owner can use a client computer, such as the client 115, to request a financing quote from the property services server platform 145. In response to loan parameters specified by the owner, the property services server platform 145 can complete an on-line financing application and forward the completed application to one or more lenders at the client 120. The lender can process the electronic data set associated with the completed financing application and transmit a financing quote to the owner via the distributed computer network 105. For an exemplary embodiment, the completed financing application prepared by the property services server platform 145 can include in electronic format the loan request, property-related research, property valuation, and other information selected by the user.

The property services server platform 145 also can support the negotiation and execution of the real estate transaction in an on-line environment. For example, a tenant operating at the client 110 and a property owner operating at the client 115 can evaluate the parameters of a real estate transaction by using the tools and research available at the property services server platform 145. In an on-line exchange hosted by the property services server platform 145, the tenant at the client 110 can post a bid and, in response, the property owner at the client 115 can post a reply. A deal agent at the client 135 can work with the tenant at the client 115 via the distributed computer network 105 to support transaction negotiations. Upon completion of on-line negotiations, the transaction can be formalized by populating an on-line agreement with the negotiation terms. It will be appreciated that this on-line transaction environment operates to reduce the transaction costs associated with a conventional real estate transaction. On-line lease transactions will be described in more detail below with respect to FIGS. 3-4.

In view of the foregoing, it will be appreciated that the on-line environment 100 supports the effectiveness and efficiency of commercial real estate professionals in the execution of leasing, financing, and buy-sell transactions. This on-line environment 100 can fulfill the needs of its users by supporting efficient communication of information via a distributed computer network among a community comprising tenants, owners, lenders, site visit agents, property specialists, deal agents, cost center agents, and a variety of other service providers.

Figure 2:
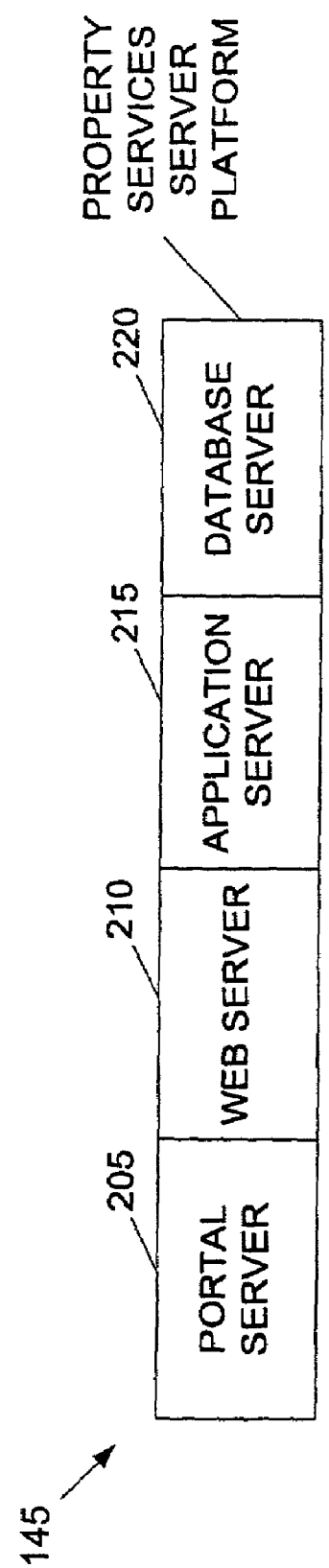
FIG. 2 is a block diagram illustrating the primary components of a property services server platform constructed in accordance with an exemplary embodiment of the present invention.

FIG. 2 is a diagram illustrating the primary components of the property services server platform 145. Turning now to FIG. 2, the property services server platform 145 comprises a portal server 205, a Web server 210, an application server 215 and a database server 220. As indicated by their descriptive names, the servers 205-220 support portal, Web, application and database functions of property services server platform 145. For the exemplary embodiment, the operating environment is implemented by Sun Microsystem's "SOLARIS" operating system. An "Epicentric" server implements the portal server 205. An "iPlanet" server implements the Web server 210. A "WebLogic" server implements the application server 215, which supports the ASP model. The database server 220 is implemented by Oracle's "8I" server and corresponding database. Although not illustrated in FIG. 2, it will be understood that the property services server platform 145 is protected by conventional firewalls, being SSL security protocol, physical security, and includes emergency back-up capabilities.

On-Line Leasing Transactions

Figure 3A:
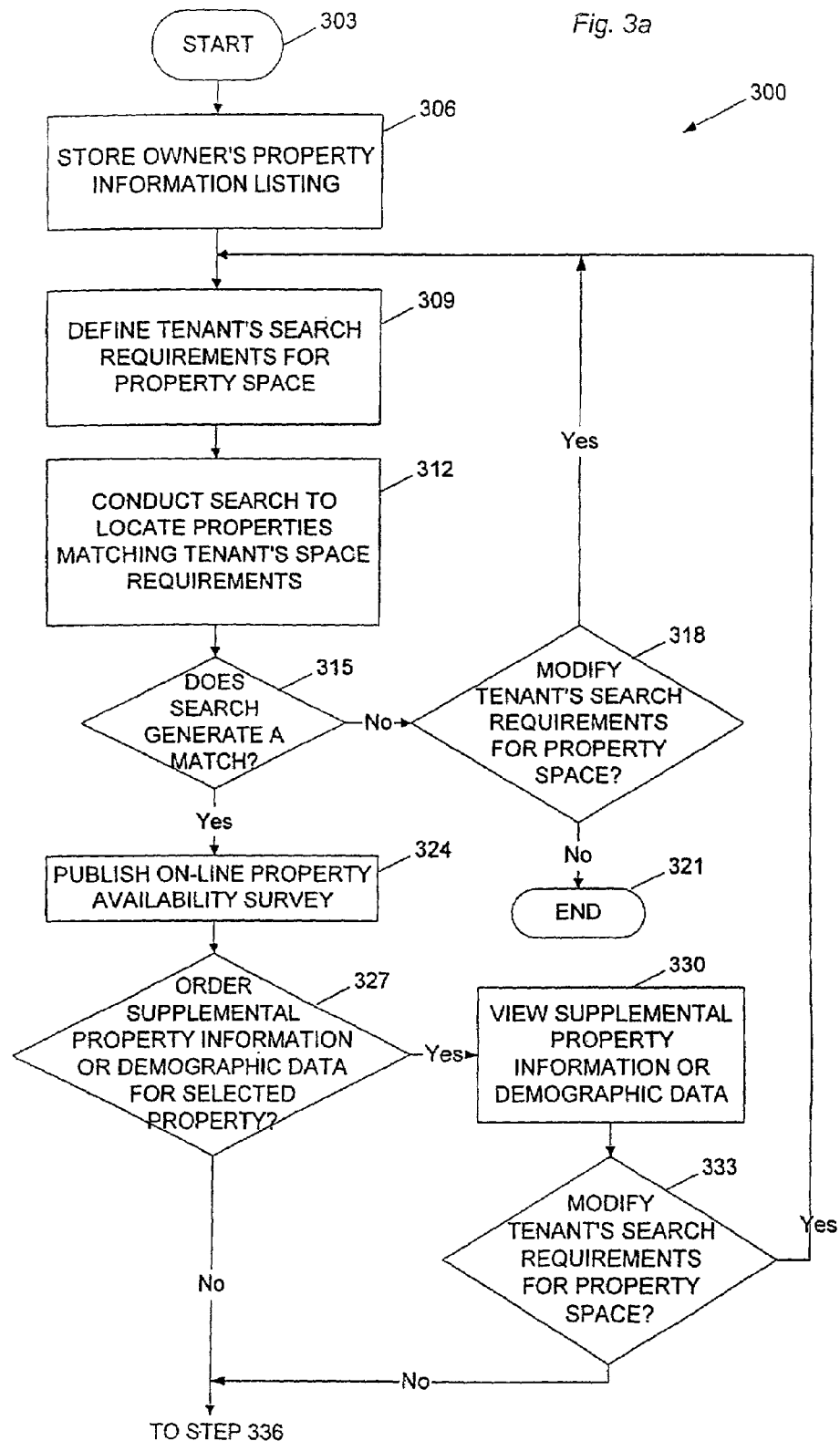
FIGS. 3*a*, 3*b*, and 3*c*, collectively described as FIG. 3, are flowchart diagrams illustrating the process for completing an on-line leasing transaction in accordance with an exemplary embodiment of the present invention.
Figure 3B:
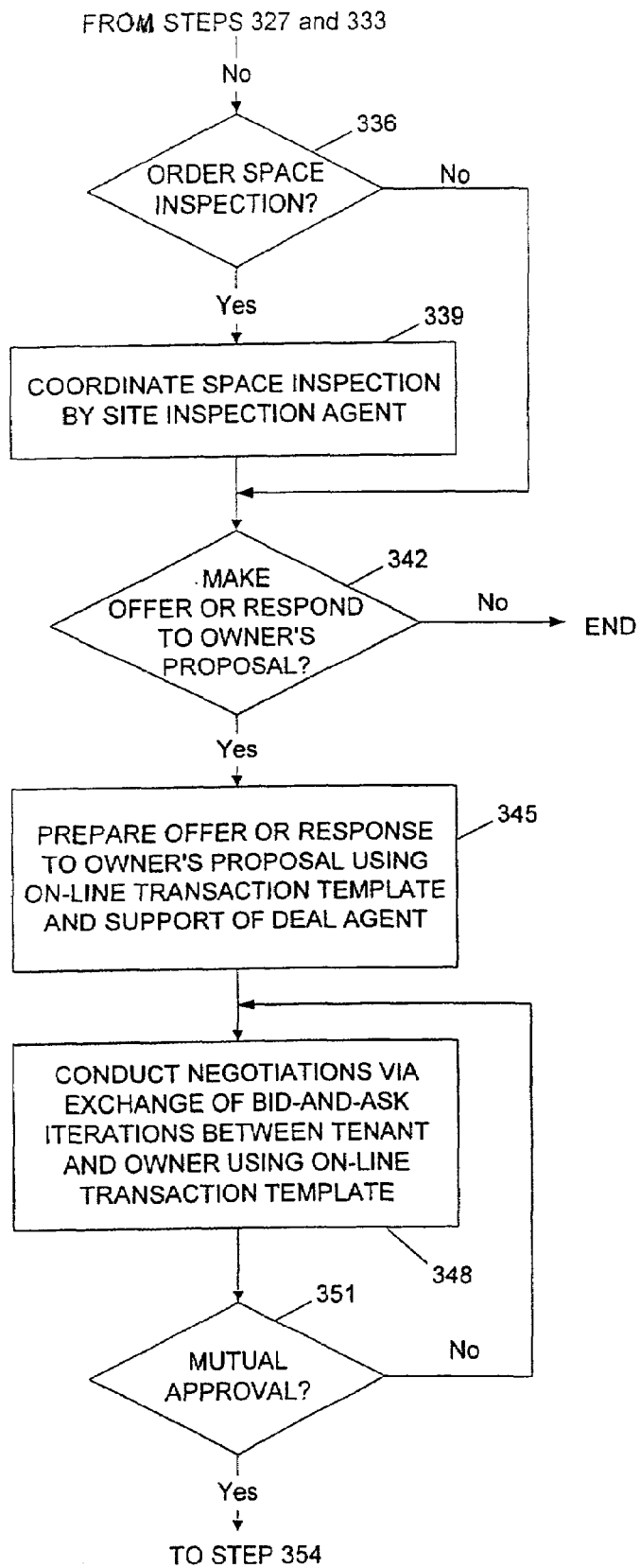
Figure 3C:
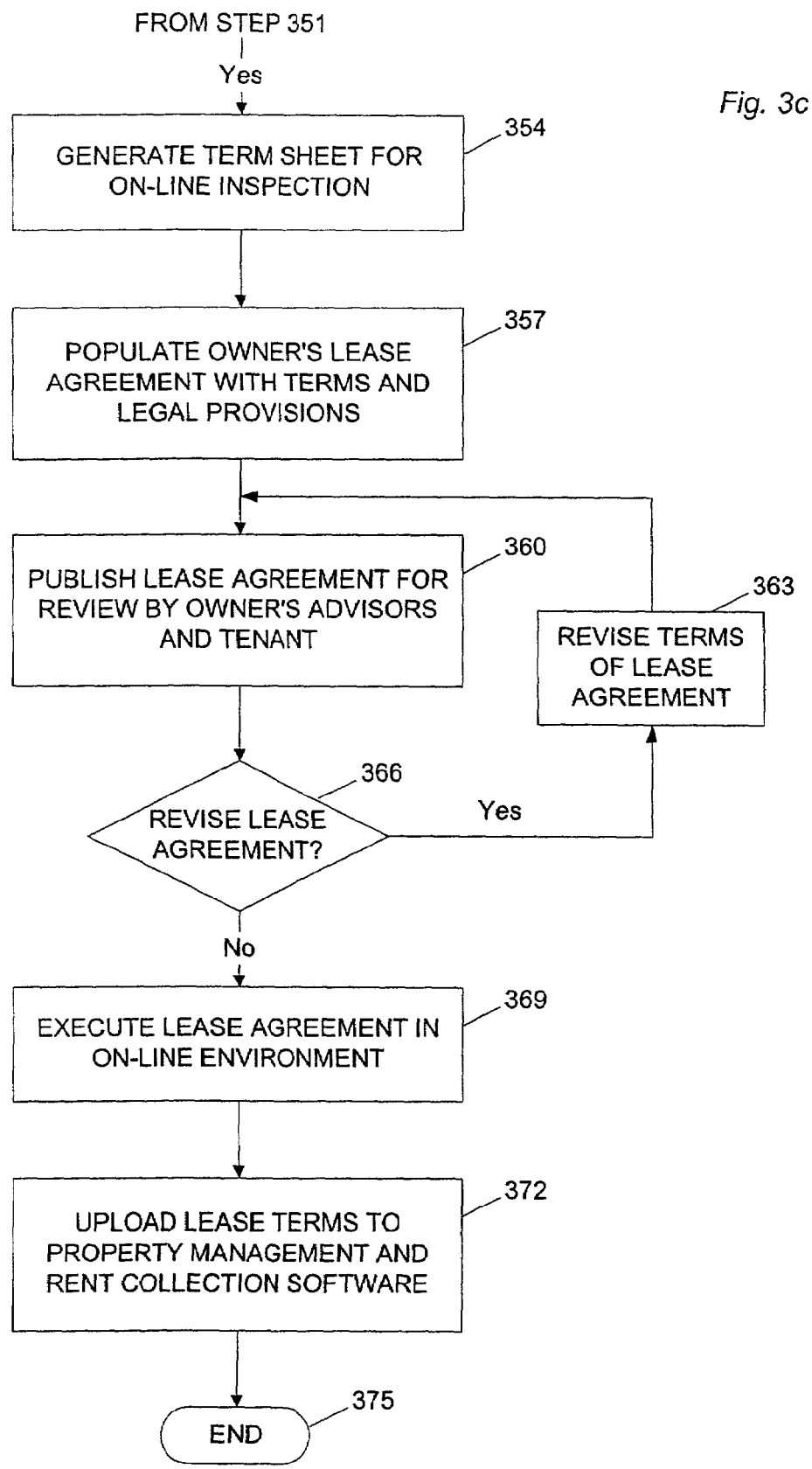

FIGS. 3a, 3b, and 3c, collectively described as FIG. 3, are logical flowchart diagrams illustrating an exemplary on-line process for completing a leasing transaction in the commercial real estate field. Turning now to FIG. 3a, the exemplary process 300 is initiated at the "START" step 303 by constructing a database coupled to a distributed computer network for storing listings of available properties for lease to potential tenants. To build this property database, one or more property owners can store property information listings in the database by sending the property information listing from a client computer to the property services server platform via the distributed computer network, as shown in step 306. The property owner can add a listing by completing one or more display screens prompting the entry of the property information in an organized manner for storage at a database accessible to the property services server platform. In the alternative, the property owner can use property management software program to download a property listing to the database maintained by the property services server platform.

In step 309, a tenant (or her broker) defines search requirements for a property space. Similar to the entry of property information at the property services server platform, the tenant can enter property space requirements by responding to prompts at display screens published by this server platform. The property space requirements are associated with the particular tenant and stored in a database accessible by the property services server platform. Using the search features of the property services server platform, the tenant can complete a property listing search by product type (office, retail, and industrial) and other real estate parameters, including city, submarket, amount of space, asking rent, building name, or address. Prior to initiating a search, the tenant or her broker can use a space planning calculator available at the property services server platform to calculate space requirements for a desired new location.

In step 312, the property services server platform conducts a search to locate properties matching the tenant's space requirements. This search is completed by attempting to match the tenant's space requirements identified in step 309 to the property information listings maintained by one or more databases accessible by the property services server platform.

In decision step 315, an inquiry is conducted to determine whether the search has generated a match between the tenant's requirements and property listings. If the response to this inquiry is negative, the "NO" branch is followed from step 315 to decision step 318. In step 318, a determination is made whether the tenant desires to modify her search requirements for a property space. If not, the process 300 terminates for failure to locate a property space that matches the tenant's requirements, as shown in step 321. If the response to the inquiry in decision step 318 is positive, however, the "YES" branch is followed to step 309 to redefine the tenant's property space requirements.

If the search in the decision step 315 results in a match, the exemplary process 300 proceeds to step 324 and the property services server platform publishes an on-line property availability survey. A typical property availability survey identifies the matching properties and relevant property information listings.

In decision step 327, a determination is made whether the tenant desires to order supplemental property information or demographic data before a property identified by the property availability survey. If so, this order is processed by the property services server platform and the requested supplemental property information or demographic data is retrieved from databases or service providers coupled to the distributed computer network. In step 330, the requested supplemental property information or demographic data is published for viewing by the tenant. In response to this published information, the tenant may elect to modify her search requirements for property space, as indicated by decision step 333. If the tenant desires to modify her search requirements, the "YES" branch is followed from decision step 333 to step 309 and the process begins anew. Otherwise, the "NO" branch is followed from decision step 333 to decision step 336. Similarly, the exemplary process 300 follows the "NO" branch from decision step 327 to decision step 336 in response to a determination by the tenant to not order supplemental property information or demographic data about a selected property.

Turning now to FIG. 3b, in decision step 336, a tenant makes a determination whether to order a site inspection for the selected property. If the response to this inquiry is negative, the "NO" branch is followed from decision step 336 to decision step 342. Otherwise, in step 339 the property services server platform facilitates the coordination of a space inspection by a site inspection agent for the property selected by the tenant. For example, the tenant can select a desired site inspection agent operating at a location proximate to the property from a list of potential site inspection agents published by the server platform. In the alternative, the tenant can contact a call agent at a call center client via the distributed computer network to request a space inspection by a member of a prequalified list of site inspection agents. The tenant can coordinate the site inspection agent selection and site visit schedule via electronic mail operations facilitated by the server platform or via other conventional communication means, such as telephone or facsimile transmission.

In decision step 342, a tenant makes a determination whether to make an offer on the property space to the property owner or to respond to an owner's initial proposal. If the response to this inquiry in step 342 is negative, the exemplary process 300 proceeds to the "END" step and terminates. Otherwise, the "YES" branch is followed from decision step 342 to step 345.

In step 345, the tenant can prepare an offer or response to an owner's proposal by using an on-line transaction template published by the property services server platform. The tenant's offer or response can be supported by a deal agent selected by the tenant in connection with services offered by the property services server platform. For example, the property services server platform can assist the tenant in selecting an independent deal agent that will provide dedicated support of the proposed transaction. The tenant can select a deal agent based upon a listing of deal agents published at the Web site or by contacting a customer service call center via the Web site.

In step 348, the parties conduct negotiations via an exchange of bid-and-ask messages communicated via the property services server platform to the associated client computers of the tenant, owner (and deal agent, broker, and other service advisors as required). Advantageously, the negotiations can be conducted in an on-line environment based upon the centralized Web site operations supported by the real services server platform. It will be appreciated, however, that these on-line negotiations can be supplemented by other conventional communication means, including telephone, facsimile transmissions, correspondence, etc. Nevertheless, the intent of completing on-line negotiations is to take full advantage of the communication efficiencies offered by a distributed computing network.

If the parties reach mutual approval of the negotiated terms for a lease transaction in decision step 351, the "YES" branch is followed to step 354. Otherwise, the negotiations continue by following the "NO" branch from decision step 351 via a loop to step 348.

Turning now to FIG. 3c, in step 354, the property services server platform generates a term sheet for inspection in an on-line environment by the parties, namely the tenant and the property owner (and deal agent, broker, and other service advisors, where appropriate). Based on a positive inspection, the property services server platform populates a lease agreement, typically the owner's lease agreement, with terms and legal provisions based upon a standard contracting template in step 357. In turn, the property services server platform publishes the lease agreement for review by the owner and the tenant (and their advisors, where appropriate) in step 360.

In decision step 366, an inquiry is conducted to determine whether a party desires to revise the lease agreement published by the property services server platform. If so, the "YES" branch is followed from decision step 366 to step 363 and lease terms are revised by the parties in an on-line environment. The exemplary process 300 then proceeds again to step 360 for publication of the revised lease agreement by the property services server platform.

If the parties do not elect to revise the lease agreement, the "NO" branch is followed from decision step 366 to step 369. The parties can execute the lease agreement in an on-line environment with the support of the property services server platform in step 369.

In optional step 372, a party can elect to upload selected lease terms in the electronic lease agreement to property management-related software operating at the party's client site. The exemplary process 300 terminates at the "END" step 375.

Alternative Exemplary Embodiments

Figure 4A:
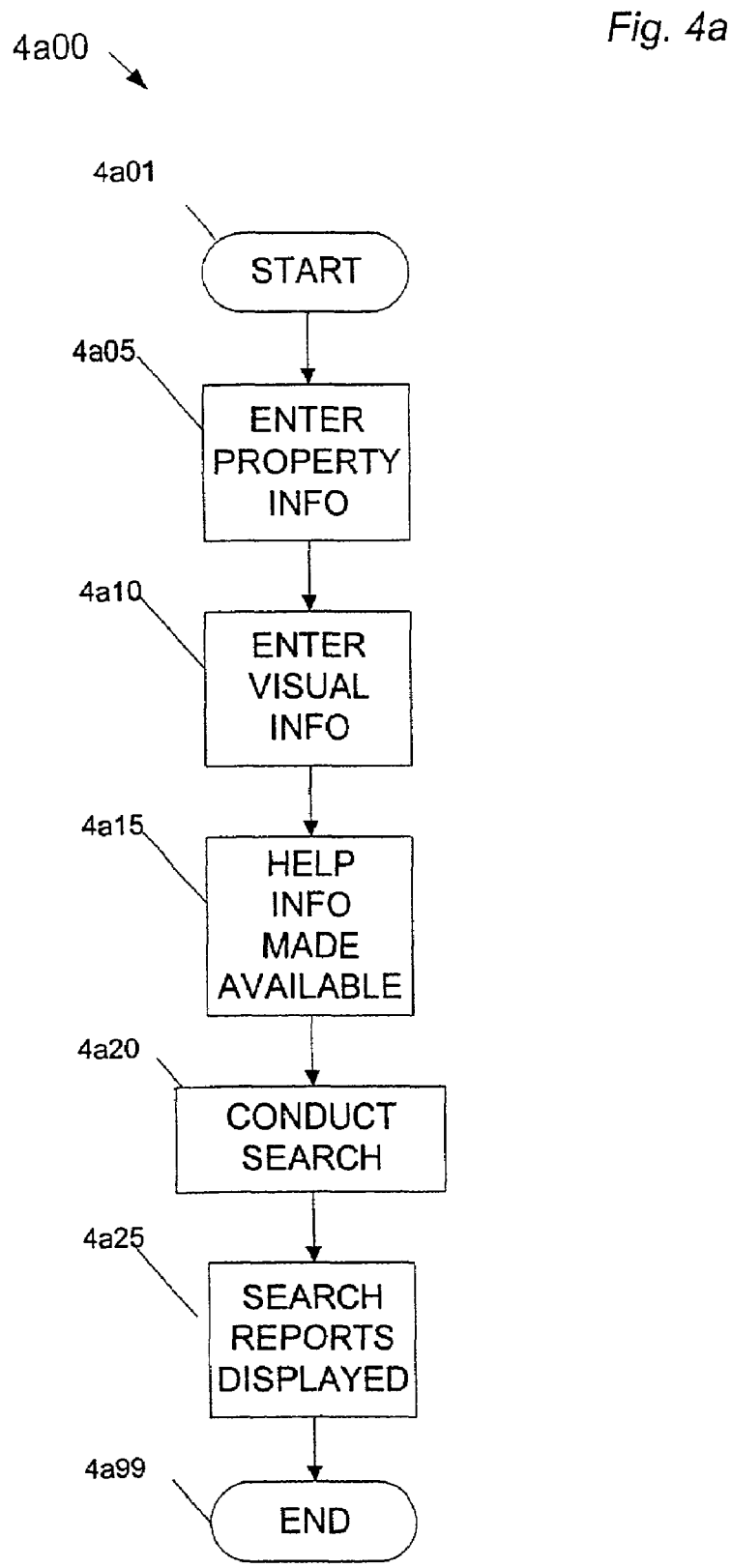
FIGS. 4*a*, 4*b* and 4*c*, collectively described as FIG. 4, are flowchart diagrams illustrating the process for completing on-line leasing transactions in accordance with alternate exemplary embodiments of the present invention.
Figure 4B:
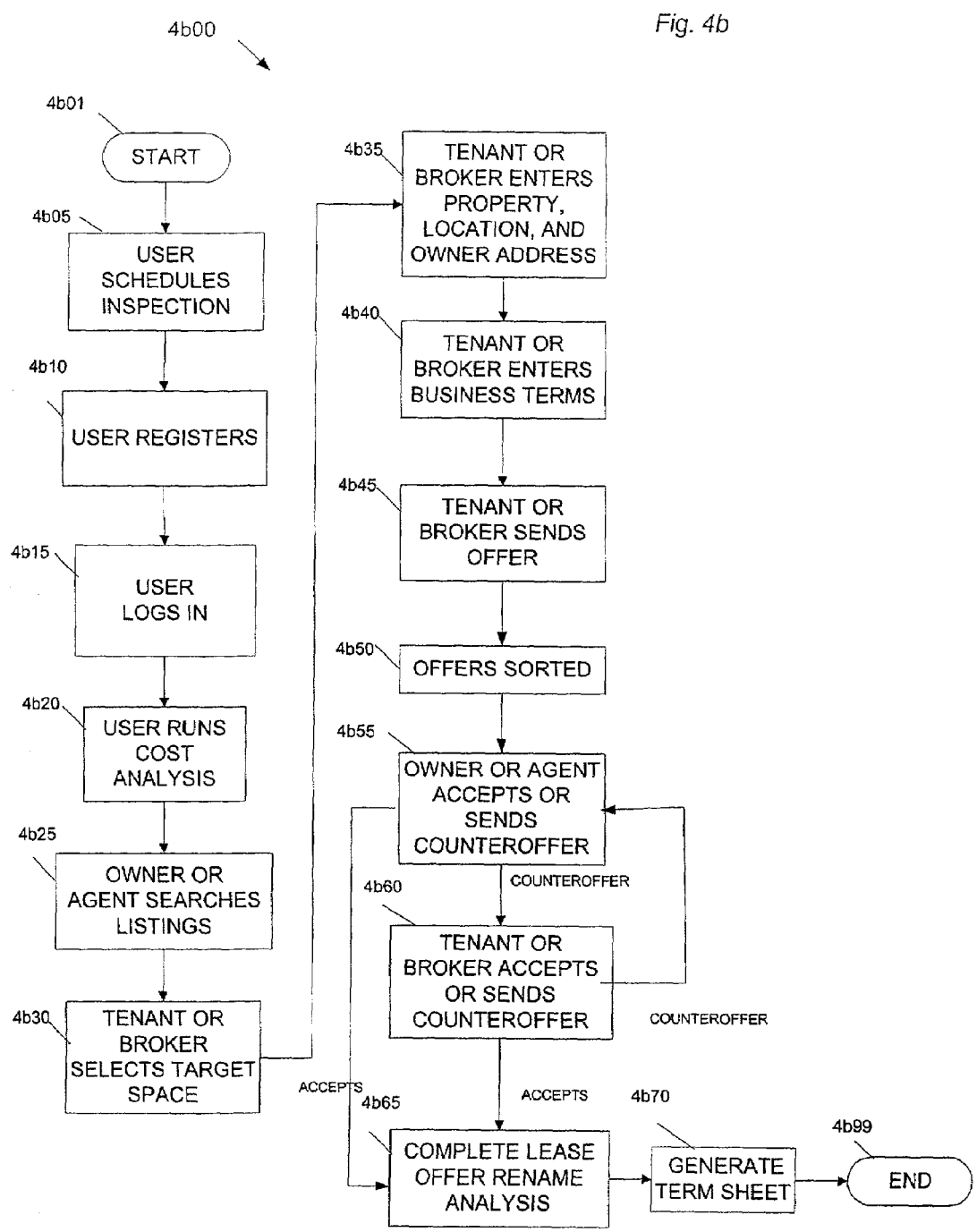
Figure 4C:
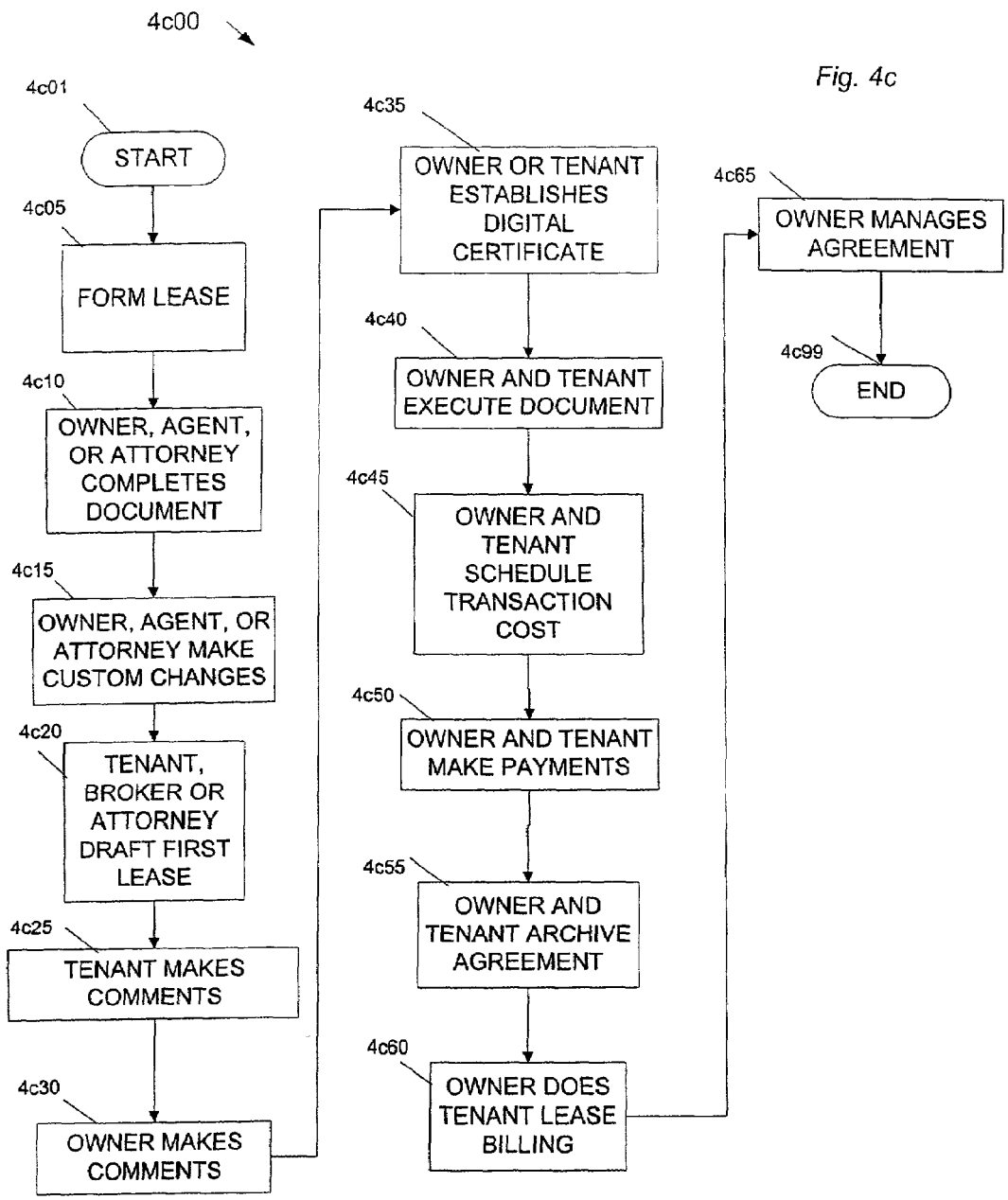

FIGS. 4a, 4b and 4c, collectively described as FIG. 4, are flowchart diagrams illustrating processes for completing an on-line leasing transactions in accordance with alternative exemplary embodiments of the present invention.

Alternative Embodiment 1

FIG. 4a is a flowchart diagram illustrating one exemplary embodiment. Alternative embodiment 1 includes research capabilities, valuation and calculator tools, and a community of accounting, legal and environmental experts. Alternative embodiment 1 provides transaction capabilities for: space listings, referrals to financing sources, third-party provider and professional service firms, and links to preferred procurement and online recruiting. Alternative embodiment 1 creates a package containing free research, a valuation of the proposed deal, and digital documents.

Referring to FIG. 4a, the exemplary process 4a00 is initiated at the "START" step 4a01. In step 4a05, property information is entered. The property information includes a building name, an address, a city, a state, a zip code, a submarket, a floor or suite, a rentable area amount, a will-divide amount, an owner name, a product segment, a product class, a rent amount per square foot, an availability date, a rental term, an operating escalation, a tax escalation, any utilities, any building service, any work offered, any parking, and whether there is a sublease. For the owner name option, there is a pull-down portfolio option, and a space for an address. For the product segment option, there is a choice of office, industrial, or retail, For the product class, there is an A/B/C option. For the will divide option, a "YES" or "NO" answer is accepted. For the sublease, a "YES" or "NO" answer is accepted.

In step 4a10, visual information is entered. The visual information includes a floorplan and/or a building photo. The floorplan and building photo can be scanned and emailed or retrieved from a database.

In step 4a15, help information is made available. In step 4a20, a search is conducted. The help information includes technical problems and source material questions. The technical problems include calls and email to a call center or tech representative. The source material questions include calls and emails to content providers. The source material also includes move requirements and research. The move requirements are interactive where the tenant fills in a template to calculate his needs. For the research, links are provided to content providers initiate.

In step 4a20, the search is conducted. In step 4a25, a property search report, a market search report, and a map search report are presented. The property search report is a search done per property information criteria, and the results are sorted and presented in a report format. The market search report is an interactive link search and a sort/report per market search criteria is done with strategic partners and the database. The map search report is an interactive link with the strategic partner and content providers. The exemplary process 4a00 is concluded at the "END" step 4a99.

Alternative Embodiment 2

FIG. 4b is a flowchart diagram illustrating a second alternative exemplary embodiment of the present invention. Alternative embodiment 2 adds the valuation and property management ASP software, the workflow functionality, and the local GE office to alternative embodiment 1. These additions will be supplemented with additional content and service vendors, enhanced Web site features, and chat rooms to extend the workspace concept. Alternative embodiment 2 will include the lease management, budgeting and forecasting, property management, and valuation tools.

Referring to FIG. 4*b*, the exemplary process 4*b*00 is initiated at the "START" step 4*b*01. In step 4*b*05, the user schedules an inspection by clicking on an owner site or agent site to set the scheduled inspection time. In step 4*b*10, the user registers in an interactive manner. In step 4*b*15, the user logs in. If it is the user's first visit, and he does not have a password, he receives a password and then logs in. In step 4*b*20, the user gets a property-specific cost analysis. This is done by having the tenant click on the listing information to create a property-specific cost analysis. In step 4*b*25, the listings are searched by the owner or the agent. In step 4*b*30, the target space is selected by the tenant or broker. This is done by clicking on a suite or floor at the target building. In step 4*b*35, the property, location, and owner address is entered by the tenant or broker. In step 4*b*40, the business terms are entered by the tenant or broker. Business terms include the building number and the floor number. In step 4*b*45, an offer is sent by the tenant or broker. In step 4*b*50, the offers are sorted by owner number, building number, floor/suite, and other criteria. In step 4*b*55, the offers are either accepted or a counter-offer is sent by the owner or agent. In step 4*b*60, the tenant or broker accepts the counter-offer or sends a counter-offer. In step 4*b*65, a lease offer revenue analysis is completed. In step 4*b*70, a term sheet is generated using a comparison term sheet by having the user click on the best offer. The term sheet can be either in hard copy or email. The exemplary process 4*b*00 is concluded at the "END" step 4*b*99.

Alternative Embodiment 3

FIG. 4*c* is a flowchart diagram illustrating a third exemplary embodiment of the present invention. Alternative embodiment 3 will take advantage of the standard workflow and decision-support tools deployed in alternative embodiment 2 by allowing multiple counterparties to rapidly evaluate a deal and post a bid online with due diligence supported by service provider links. The call center will be able to facilitate the bidding process and support real-time negotiations in need, whether for leases, financing, or purchases. By dramatically reducing transaction costs, shortening cycle times and achieving critical mass, alternative embodiment 3 will create true liquidity. This will enable customers to complete their real estate deals readily at a fair price with minimal transaction costs.

Referring to FIG. 4*c*, the exemplary process 4*c*00 is initiated at the "START" step 4*c*01. In step 4*c*05, the lease is formed for the owner, agent, or attorney using an outside law firm. This is done by inputting property-specific forms with user input. In step 4*c*10, the document is completed by the owner, agent, or attorney using the term sheet or segment specific lease. This is done for the term sheet by having the user select the property type. This is done for the segment specific lease by having the user click on the term sheet to populate the lease form. In step 4*c*15, custom changes and additions are made by the owner, agent, or attorney. This is done for the term sheet by using the original email for changes. This is done for the segment specific lease by having the owner access his custom form. In step 4*c*20, the first lease is drafted by the tenant, broker or attorney. In step 4*c*25, the tenant makes comments. This is done having the user redline and strike-out information. In step 4*c*30, the owner's comments are made. This is done by having the user redline and strike-out information. In step 4*c*35, the digital signatures are established by the owner or tenant using a digital certification procedure. In step 4*c*40, the document is executed by the owner and tenant using digital signatures. In step 4*c*45, the transaction cost is scheduled by the owner and tenant by completing the fill-in template. In step 4*c*50, the payments are made by the owner and tenant using a transaction cost schedule. In step 4*c*55, the owner and tenant archive the agreement by using the lease document, transaction cost schedule, and document retention capability. In step 4*c*60, the tenant lease billing is done by the owner using the lease document. In step 4*c*65, the owner manages the agreement. The exemplary process 4*c*00 is concluded at the "END" step 4*c*99.

Property Search at Web Site

A typical layout for a Web site supporting a search by a tenant or a broker for a property of interest, in accordance with an exemplary embodiment of the present invention, is described below.

The user can access a leasing option and then initiate a search for a property. The user then selects a desired location for a property by choosing a state. After selecting a property location by state, the user can add information defining the characteristics of the desired property within the selected location. The user is told to select the appropriate search criteria and is prompted to select a property category, such as an office, an industrial, a retail or a multi-family property category. The user then selects one or more property subcategories, and then defines the space criteria and the location criteria. The space criteria includes a lease rate, the available space, and when the space is listed. The location criteria includes markets, selected markets, submarkets, and selected submarkets.

Based upon the characteristics for the property defined by the user, the property services server platform conducts a search of property listings maintained in one or more databases to locate property listings that match the desired property characteristics. A property availability survey is published by the property services server platform upon a completion of the search. The property availability survey identifies matching properties by photo, name/address, city/state, type, square footage, rent cost, and contact information. In addition, the user has the option of clicking on a column heading to sort search results by the selected column.

Adding Property Listing to Database Accessible by Web Site

A typical layout for a Web site supporting the addition of a property listing to one or more databases accessible by that Web site, in accordance with an exemplary embodiment of the present invention, is described below.

The user, typically a property owner or broker, can initiate the addition of a property listing at the Web site published by the property services server platform by selecting a hyperlink from a lease transaction start page. In response to the selection of this hyperlink, the user is prompted to add a property listing by selecting the relevant property category listed in the display screen.

Upon selecting the relevant property category, the user is prompted to define the characteristics of the listed property. The characteristics include an office for a single tenant, a retail space for a single tenant, an office for multiple tenants, shopping centers, an industrial space for a single tenant, an industrial space for multiple tenants, a space for an office and an industrial park, and a multi-housing space.

The user is requested to provide the property information. The property information includes the property type, property name, property address, asking price, down payment, square footage, year of construction, parcel size, lease and escalation, property description, and property location. The user is also asked to enter the tenant information.

Under the controlled access marketing option, the user has the option of making the property listing a confidential listing by supplying a confidential password at this display screen. Under the password information option, the user is asked to enter a password that allows the user to edit his listing. The objective is to prompt the user to complete a full and accurate definition of a property listing that would be useful for review by potential tenants and brokers.

The user can also access a confirmation page confirming the submission of a property listing for storage by a database accessible by the property services server platform. By selecting a hyperlink for the property listing confirmation, the Web site publishes a new page presenting the property information in a format presented to inquiring parties. The property information includes a property description, property highlights, an image of the building (if available), space characteristics, and information for the leasing office.

The invention claimed is:

1. A computing system for enabling a lease transaction for real property in an on-line computing environment, comprising:
    a property management services server hosting a leasing software module for enabling the lease transaction;
    at least one database, coupled to said property management services server, storing real estate property-related data for a plurality of real estate properties; and
    a plurality of client computers coupled to said property management services server, at least one client computer operable by an owner and at least one client computer operable by a tenant, wherein the owner and the tenant input predetermined information about a selected real estate property into said leasing software module and negotiate an electronic term sheet using said leasing software module in support of the lease transaction for the selected real estate property,
    wherein said leasing software module accesses the property-related data on one of said at least one database to obtain data relevant to the selected real estate property, populates a lease agreement based on predetermined information from an owner of the selected real estate property and information in the electronic term sheet negotiated by the owner and the tenant, and presents the populated lease agreement and the comparables data for approval by the owner and the tenant.

2. The system of claim 1, wherein said client computers comprise one or more of
    a lender client computer operable by a lender to support property financing requirements for the selected real estate property;
    a site visit agent client computer operable by a site visit agent to support on-site property review and analysis of the selected real estate property;
    a property specialist client computer operable by a property specialist to provide property-related expertise in connection with the selected real estate property; and
    a deal agent client computer operable by a deal agent to screen, negotiate, and close property-related transactions in connection with the selected real estate property.

3. The system of claim 2, wherein the property specialist client computer is operable by a property specialist comprising one of a property appraisal specialist, a property engineering specialist, and a property environmental specialist.

4. The system of claim 2, wherein said client computers further comprise a call center client computer operable by a call center agent, and
    wherein the tenant can select a user operating another one of the client computers by contacting the call center agent.

5. The system of claim 1, wherein said at least one database comprises a local database maintained by a party responsible for said property management services server.

6. The system of claim 1, wherein said at least one database comprises a remote database maintained by a party other than a party responsible for said property management services server.

7. The system of claim 1, wherein said property management services server is operable to store information about a plurality of site visit agents that support on-site property review and analysis of the selected real estate property, and
    wherein a tenant can select one of the site visit agents from the information stored on the property management services server to support the lease transaction.

8. The system of claim 1, wherein said property management services server is operable to store information about a plurality of deal agents that screen, negotiate, and close property-related transactions, and
    wherein a tenant can select one of the deal agents from the information stored on the property management services server to support the lease transaction.

9. The system of claim 1, wherein said property management services server is operable to store information about a plurality of property specialists that provide property-related expertise in connection with the selected real estate property, and
    wherein a tenant can select one of the property specialists from the information stored on the property management services server to support the lease transaction.

10. A computer-implemented method for conducting a lease transaction for real estate property in a distributed computer network environment, comprising the steps of:
    storing property characteristics from an owner for a plurality of the owner's real estate properties in an electronic database;
    defining a tenant's property requirements for leasing a real estate property using a software module operating on a property services server;
    identifying with the software module a matching property from one of the owner's real estate properties, the matching property comprising property characteristics from the owner that match the tenant's property requirements;
    publishing with the software module the matching property that matches the tenant's property requirements;
    storing in the electronic database an electronic term sheet negotiated by the owner and the tenant using the software module operating on the property services server;
    creating a lease agreement for the matching property by populating the property characteristics from the owner for the matching property and the terms of the electronic term sheet into a form lease agreement comprising lease terms and legal provisions; and
    publishing the created lease agreement for review by the tenant and the owner.

11. The method of claim 10, further comprising the steps of:
    allowing the tenant and the owner to revise the lease agreement via the distributed computer network; and allowing the tenant and the owner to execute the lease agreement via the distributed computer network.

12. The method of claim 10, further comprising the steps of:

allowing the tenant to make an offer via the distributed computer network to lease the matching owner property;

allowing an owner of the matching owner property to accept the offer via the distributed computer network; and allowing the tenant and the owner to modify the offer via the distributed computer network.

13. The method of claim 10, wherein said owner property characteristics are stored in a plurality of remote databases maintained by one or more third parties.

14. The method of claim 10, further comprising the steps of:

storing information for a plurality of deal agents that screen, negotiate, and close property-related transactions; and selecting, based on the stored information, one of the deal agents via the distributed computer network to support the lease agreement for the matching owner property.

15. The method of claim 10, further comprising the steps of:

storing information for a plurality of property specialists that provide property-related expertise in connection with the selected real estate property; and selecting, based on the stored information, one of the property specialists via the distributed computer network to support the lease agreement for the matching owner property.

16. The method of claim 15, wherein each of the property specialists comprises one of a property appraisal specialist, a property engineering specialist, and a property environmental specialist.

17. A system for enabling a lease transaction for real property in an on-line computing environment, comprising:

a property management services server, coupled to a distributed computer network, hosting a leasing software module for enabling the lease transaction, storing information for a plurality of clients, and operable to receive a tenant's property requirements for leasing a real estate property; and a plurality of remote databases, coupled to said property management services server, each storing real estate property-related data, including owner property characteristics for a plurality of real estate properties, said remote databases being maintained by one or more third parties;

wherein, responsive to receiving the tenant's property requirements by the property management services server, said leasing software module accesses the owner property characteristics in at least one of said remote databases to identify a matching property comprising owner property characteristics that match the tenant's property requirements, wherein the matching property becomes a subject of the lease transaction, wherein said leasing software module stores an electronic term sheet negotiated by an owner of the matching property and the tenant using the leasing software module, and wherein said leasing software module populates a lease agreement based on the owner property characteristics and the negotiated electronic term sheet.

18. The system of claim 17, further comprising a plurality of client computers, coupled to said property management services server, each operable to input predetermined information about the matching property into said leasing software module in support of the lease transaction for the matching property.

19. The system of claim 18, wherein said plurality of client computers comprises at least one of:

a lender client computer operable by a lender to support property financing requirements for the matching property;

a site visit agent client computer operable by a site visit agent to support on-site property review and analysis of the matching property;

a property specialist client computer operable by a property specialist to provide property-related expertise in connection with the matching property; and a deal agent client computer operable by a deal agent to support screening, negotiating, and closing property-related transactions in connection with the matching property.

20. The system of claim 17, further comprising a local database operable to store information about a plurality of deal agents that screen, negotiate, and close property-related transactions, and wherein said property management services server is further operable to receive instructions to select one of the deal agents from the information stored in the local database to support the lease transaction.

21. The system of claim 20, wherein said local database is further operable to store information about a plurality of property specialists that provide property-related expertise in connection with the selected real estate property, and wherein said property management services server is further operable to receive instructions to select one of the property specialists from the information stored on the property management services server to support the lease transaction.

* * * * *